March 14, 1933.   K. ENGEL   1,901,739
ATTACHMENT FOR SHEARS
Filed Dec. 3, 1931
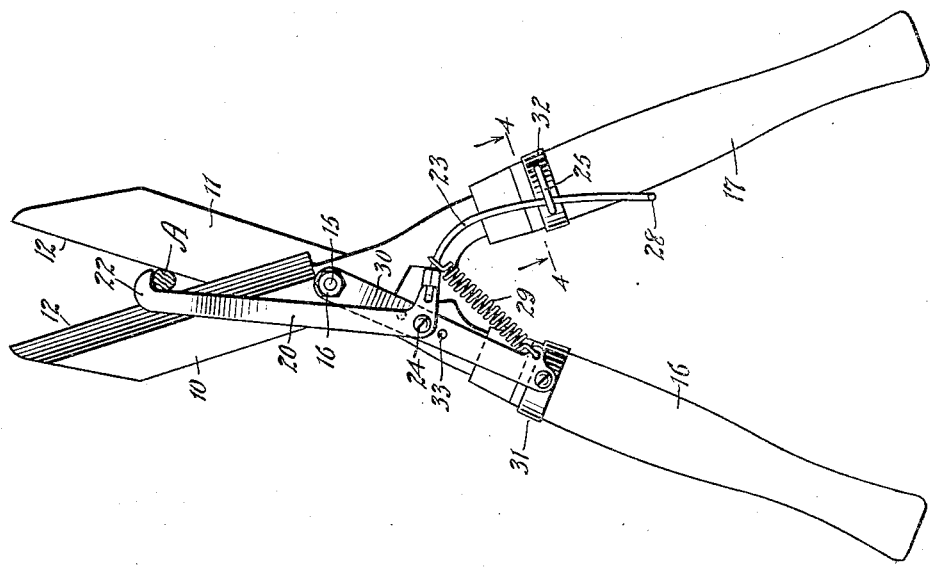
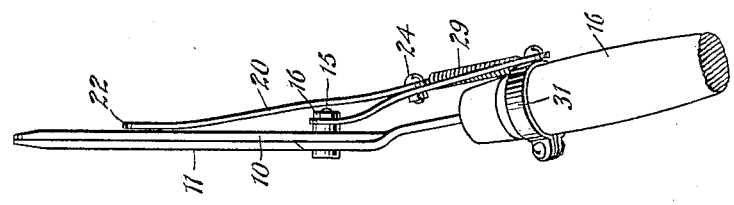
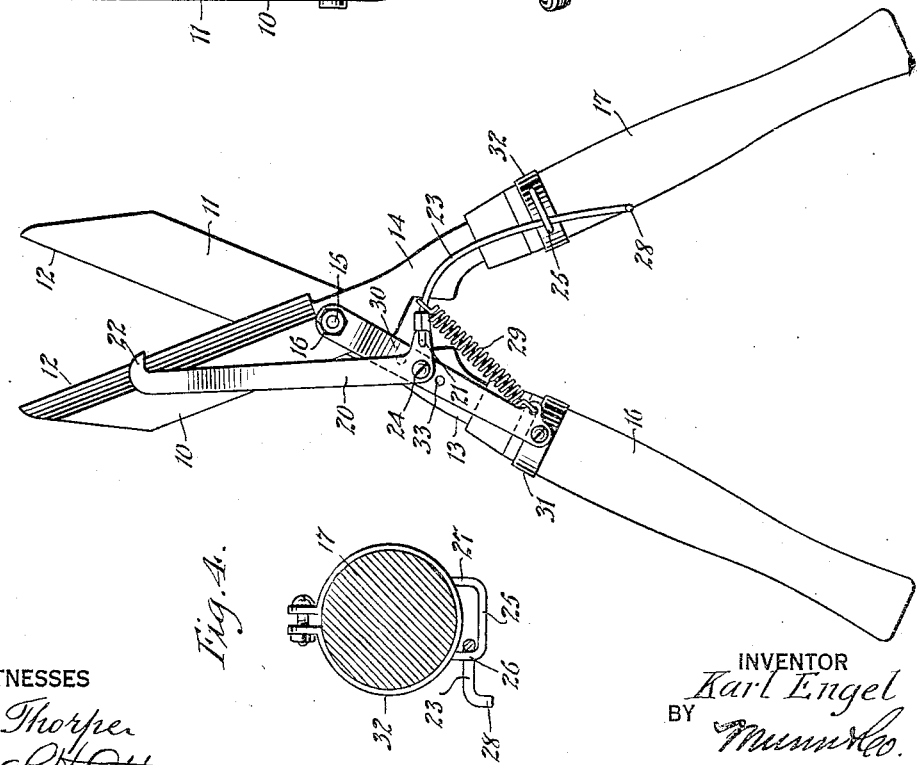
WITNESSES
Edw. Thorpe
Hugh H. Ott
INVENTOR
Karl Engel
BY Munn & Co.
ATTORNEY Patented Mar. 14, 1933

1,901,739

UNITED STATES PATENT OFFICE

KARL ENGEL, OF NEW YORK, N. Y.

ATTACHMENT FOR SHEARS

Application filed December 3, 1931. Serial No. 578,812.

This invention relates to an attachment for shears of the type which are particularly designed for the trimming of hedges or pruning of shrubs or other plants.

The ordinary shears have been found to be open to the objection that where thick stems are to be cut, the cutting edges of the blade tend to force or cam the stems outwardly and hence repeated attempts must be made before actual severance thereof is accomplished.

To overcome this objection, the present invention comprehends an attachment which provides a stem holding means carried by and disposed in a non-interfering relation to the cutting edges of the shear blades when opened, to permit of the reception of the stem to be cut, and which means upon closing movement of the blade edges is swung into an active position to engage and hold the stem during the severance thereof.

The invention further contemplates an attachment of this character which may be formed as a permanent part of the shears or removably associated therewith so that the attachment may be optionally used.

Other objects of the invention reside in the comparative simplicity of construction of the attachment, the economy with which it may be produced and incorporated in the shear structure and the general efficiency derived therefrom.

With the above recited and other objects in view, reference is had to the following description and accompanying drawing, in which there is exhibited one example or embodiment of the invention, while the claims define the actual scope of the same.

In the drawing:

Figure 1 is a front view of a pair of shears equipped with an attachment constructed in accordance with the invention and illustrating the shear blades in opened condition, with the work holding means retracted.

Figure 2 is an edge view thereof.

Figure 3 is a view similar to Figure 1 illustrating the position of parts when the shears are actively cutting the work while being retained by the holding means.

Figure 4 is an enlarged transverse sectional view taken approximately on the line 4—4 of Figure 3.

Referring to the drawing by characters of reference, 10 and 11 designate respectively the blades of a pair of shears having cooperative cutting edges 12—12, and which blades are provided respectively with the shank portions 13 and 14 having pivotal connection by bolt 15 and nut 16. The shanks 13 and 14 are provided with the usual handles 16 and 17.

As illustrated by way of example, the attachment consists of a member having a pair of angularly related arms 20 and 21, the former being substantially straight and provided at its free end with a hooked work engaging terminal 22, and the latter arm 21 having a curved portion 23. The arms 20 and 21 of the member are fulcrumed adjacent their juncture as at 24 to a fixed point with reference to one of the blade shanks, in the present instance the blade shank 13, so that said fulcrum point 24, which is located between the pivotal connection 15 of the blades and the handle 16 in the present instance, does not have any relative movement with respect to the blade shank during the operation of the shears. The member, however, is designed to swing relative to the blade and blade shank with reference to which the fulcrum point 24 has its fixed relation, and swinging movement is imparted to said member by virtue of the engagement of the curved portion 23 of the arm 21 with a guide 25 formed on the handle of the other blade. The arrangement is such that when the blades 10 and 11 are opened, the member is caused to turn on its fulcrum 24 so as to swing the arm 20 and its hooked terminal 22 away from and beyond the cutting edge 11 to a non-interfering position to the reception of the work or article to be cut, as illustrated in Figure 1 of the drawing. Conversely, when the shears are manipulated to move the cutting edges of the blades toward each other, the guide 25 cooperates with the curved portion 23 of the arm 21 to turn the member on its fulcrum 24 and swing the hooked terminal 22 to substantially the position illustrated in Figure 3, where it engages with and holds the work or article A against longitudinal outward movement with respect to the cutting edges of the blades, thus insuring severance of the article.

As illustrated in the present instance, the guide 25 is in the nature of a loop or staple presenting a pair of spaced legs 26 and 27, and within which the curved portion 23 of the arm 21 moves. The free end of the curved portion 23 is provided with an offset terminal 28 which is adapted to coact with the guide 25 to limit the opening movement of the shears. If desired, a spring or other equivalent means 29 anchored at one end and engaging at its other end with the arm 21 functions to maintain the curved part 23 of the arm in contact with the leg 26 of the staple or guide 25 and also functions to effect the swinging of the shear blades to a closed relation.

In order to render the attachment capable of optional removal, the fulcrum 24 extends through a supporting strip 30, one end of which is secured over the pivot 15 of the blades by the nut 16, and the other end of which is secured to a split ring 31 adapted to embrace one of the handles, in the present instance the handle 16. The guide or staple 25 is likewise carried by a split ring 32 which embraces and is clamped upon the other handle, in the present instance the handle 17.

For the purpose of obtaining adjustment as to the point at which the work holding terminal 22 will intersect the cutting edges of the blades, the supporting strip 30 is formed with a series of openings 33 which selectively receive the fulcrum 24.

In use and operation, the arm 20 of the attachment swings to a non-interfering position, as illustrated in Figure 1, when the blades 10 and 11 are opened and the opened blade edges are positioned relative to and receive therebetween the article A to be cut, after which closing movement of the blades 10 and 11 will cause the arm 20 to be swung to dispose the hooked work engaging terminal 22 behind the article A, as illustrated in Figure 3 of the drawing. Continued closing movement of the blades obviously severs the article A and positively precludes longitudinal outward movement of the article with reference to the blade edges.

While there has been illustrated and described a preferred embodiment of the invention, it is to be understood that variations and modifications thereof which fall within the scope of the claims may be resorted to when desired.

What is claimed is:

1. A work holding attachment for shears including a member having a pair of angularly related arms fulcrumed at their juncture to a fixed point with reference to one of the blades between the pivotal connection of the blades and the handle of said blade, one of said arms extending beyond the pivotal connection of the blades and having a hooked work engaging terminal and a guide on the handle of the other blade cooperating with the other arm of said member to cause the first mentioned arm to move with and relative to the shear blades and spring means acting upon the member to normally swing the first mentioned arm past the cutting edge of the first mentioned blade when the shears are closed.

2. A work holding attachment for shears including a member having a pair of angularly related arms fulcrumed at their juncture to a fixed point with reference to one of the blades between the pivotal connection of the blades and the handle of said blade, one of said arms extending beyond the pivotal connection of the blades and having a hooked work engaging terminal and a guide on the handle of the other blade cooperating with the other arm of said member to cause the first mentioned arm to move with and relative to the shear blades and spring means acting upon the member to normally swing the first mentioned arm past the cutting edge of the first mentioned blade when the shears are closed and tensioning said member against movement of said arm in the other direction.

KARL ENGEL.